United States Patent
Hiller et al.

(10) Patent No.: US 12,231,438 B1
(45) Date of Patent: Feb. 18, 2025

(54) FLEET MANAGEMENT SYSTEM FOR LOCATING AND MONITORING ELECTRONIC DEVICES

(71) Applicant: Relay, Inc., Raleigh, NC (US)

(72) Inventors: Scott Hiller, Raleigh, NC (US); Sam Quaile, Durham, NC (US); Jennifer Gutsalyuk, Holly Springs, NC (US); Steve Ims, Raleigh, NC (US); Caitlyn Wiley, Raleigh, NC (US); Les James, Apex, NC (US); Carl Nelson, Fuquay-Varina, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 18/740,710

(22) Filed: Jun. 12, 2024

(51) Int. Cl.
*H04L 9/40* (2022.01)
*H04W 12/63* (2021.01)
*H04W 4/021* (2018.01)

(52) U.S. Cl.
CPC .......... *H04L 63/107* (2013.01); *H04W 12/63* (2021.01); *H04W 4/021* (2013.01)

(58) Field of Classification Search
CPC ...... H04W 4/021; H04W 12/63; H04L 63/107
See application file for complete search history.

(56) References Cited

U.S. PATENT DOCUMENTS

| | | | |
|---|---|---|---|
| 2014/0248904 A1* | 9/2014 | Meredith | H04L 63/107 455/456.1 |
| 2020/0053097 A1* | 2/2020 | Gideon, III | G07C 9/00571 |
| 2021/0166303 A1* | 6/2021 | Gideon, III | H04L 67/306 |
| 2024/0214949 A1* | 6/2024 | Srinivasan | H04W 52/248 |

* cited by examiner

*Primary Examiner* — Kristie D Shingles
(74) *Attorney, Agent, or Firm* — Gregory Stephens

(57) ABSTRACT

Embodiments of the present disclosure allow user equipments (UEs) to independently determine and communicate their location within a designated coverage area. Each UE can be equipped with RF transmitters and a GPS module, allowing it to obtain signals from RF beacons deployed throughout the coverage area to determine its location. The UEs can transmit location data to a communications platform server (CPS) when a change in location is detected. User profiles associated with each UE can define geographical boundaries, including compliance zones and non-compliance zones. The CPS can identify non-compliance events based on the location data by determining if the UE is outside a compliance zone or within a non-compliance zone, and issue notifications accordingly.

27 Claims, 6 Drawing Sheets

FLEET MANAGEMENT SYSTEM FOR LOCATING AND MONITORING ELECTRONIC DEVICES

CROSS-REFERENCES TO RELATED APPLICATIONS

This application is related to U.S. patent application Ser. No. 18/675,288 (the '288 application), filed May 28, 2024, titled "Positioning and Communication System for Dynamic Location Tracking in An Indoor Environment," which is incorporated by reference herein in its entirety. Some or all of the embodiments and/or features described herein can be used or otherwise combined with any of the embodiments and/or features described in the '288 application.

FIELD

The present disclosure generally relates to fleet management systems and, more particularly, to systems and methods for locating and monitoring electronic devices within designated coverage areas.

BACKGROUND

In various industries, electronic devices are used to support operations. These electronic devices can include communication tools, portable sensors, tracking units, dedicated team coordination devices, or the like. For example, electronic devices such as the RelayX™ by Relay, Inc. in Raleigh, NC, offer features like two-way radio capabilities, location tracking, messaging, and voice commands, facilitating team coordination and efficient workflow management.

As the number of electronic devices within an organization grows, managing this fleet of devices becomes increasingly complex. Ensuring that each device is consistently returned to its designated location after use is a notable challenge. Devices can easily be misplaced, lost, or taken outside of authorized areas, making them difficult to locate and retrieve. Additionally, the lack of a robust monitoring and alert system makes it difficult to promptly identify and address situations where devices deviate from their expected locations. This can lead to increased time and resource expenditures to locate missing devices.

Furthermore, the desire to monitor the operational status of each device can add another layer of complexity. As devices move through different locations, keeping track of their current state—such as battery level, last known location, and user assignment—can be important. Without accurate and timely information, administrators may struggle to maintain device readiness and ensure that all units are accounted for.

SUMMARY

Embodiments of the present disclosure relate to enabling user equipment (UEs) to independently determine and communicate their location within a designated coverage area. Each UE can be equipped with RF transmitters and a GPS module, allowing it to obtain signals from RF beacons deployed throughout the coverage area to determine its location. The UEs can transmit location data to a communications platform server (CPS) when a change in location is detected. User profiles associated with each UE can define geographical boundaries, including compliance zones and non-compliance zones. The CPS can identify non-compliance events based on the location data by determining if the UE is outside a compliance zone or within a non-compliance zone, and issue notifications accordingly.

Some embodiments of the present disclosure relate to a method for managing a plurality of user equipments (UEs). The UEs can be part of a system communicable with a communication platform server (CPS) over an Internet Protocol (IP) network and configured to transmit location data in response to geographical position changes. The method can include identifying, by a UE, location data indicative of a location of the UE relative to a designated coverage area. The UE can be associated with a user profile. The user profile can include a location policy that defines geographical boundaries, the geographical boundaries can include at least one of a compliance zone, within which a presence of the UE can be within compliance of the location policy, or a non-compliance zone, within which the presence of the UE can be not within compliance of the location policy. The method can include identifying, by the UE, a presence of a non-compliance event based on the location data and location policy of the user profile. The identifying can include determining that the UE is at least one of not within the compliance zone, or within the non-compliance zone. The method can include causing issuance of a notification by the UE in response to the presence of the non-compliance event.

The method of the preceding paragraph can include one or more of the following steps or features: The method can include storing environmental layout data for a collection of wireless communication nodes deployed throughout the designated coverage area. The environmental layout data can include information that uniquely identifies each wireless communication node and associates each wireless communication node with a distinct location within the designated coverage area. The method can include receiving RF transmissions from at least one wireless communication node within the collection of wireless communication nodes. The received RF transmission signal strength from a wireless communication node can be based on its proximity to the UE. Identifying the location of the UE can be based on an analysis of the signal strengths of the at least one wireless communication node RF transmission and the environmental layout data. Identifying can include assessing compliance of the UE with the location policy by cross-referencing the location data with the geographical boundaries. Identifying can include determining that the location data indicates the UE has either exited the compliance zone or entered the non-compliance zone.

The method of any one or more of the preceding two paragraphs can include one or more of the following steps or features: The non-compliance event can be a second non-compliance event. The method can include identifying a presence of a second non-compliance event; determining that the presence of the second non-compliance event coincides temporally with a permissible absence period; and refraining from issuing a notification for the second non-compliance event. The user profile can define the permissible absence period. The permissible absence period can permit the UE to be outside the compliance zone or within the non-compliance zone without triggering an alarm for a non-compliance event. The permissible absence period can be dynamically configured based on a schedule associated with the user profile. The schedule can include at least one of designated work hours, break times, or buffer periods. The user profile can define a high-risk period. The high-risk period can define intervals when non-compliance events can be more likely to occur. The method can include determining that the non-compliance event coincides temporally with the high-risk period; and escalating the notification to a more urgent alert. The escalation can include increasing a frequency of the notification.

The method of any one or more of the preceding three paragraphs can include one or more of the following steps or features: The high-risk period can correspond to an end of a worker's shift. The issuance of the notification by the UE can include triggering at least one of a visual alert, an audible alarm, or a vibrational signal on the UE. The method can include escalating a severity of the notification over time or as the UE moves further away from the compliance zone. The method can include receiving a set of user credentials corresponding to a user initiating a session with the UE; and retrieving, from a data repository, the user profile. The user profile can be associated with the user credentials. The method can include associating the user profile with the UE for a duration of the session. The user credentials can be received via an NFC chip integrated in a user badge. The associating of the user profile with the UE can be performed automatically upon detection of the NFC chip. The method can include sending a notification of the second non-compliance event to the CPS.

Some embodiments of the present disclosure relate to a system. The system can include a communication platform server (CPS), one or more user equipments (UEs) communicable with the CPS, each UE including one or more RF transmitters and a global positioning system (GPS) module; and a plurality of RF beacons placed about an area configured to define a geo-fence boundary for the UEs. A specific location of each RF beacon can be known to the CPS and/or the UEs. The system can be configured to send an alert to the UE when the UE has not received a signal from at least one RF beacon within a predetermined update period, and a last known GPS location of the UE can be outside the geo-fence boundary.

The system of the preceding paragraph can include one or more of the following features: The alert can include an audio message played on the UE, and the audio message can be indicative that the UE can be outside the geo-fence boundary. The UE can be configured to identify location data indicative of a location of the UE relative to a designated coverage area. The UE can be associated with a user profile. The user profile can include a location policy that defines geographical boundaries. The geographical boundaries can include at least one of a compliance zone, within which a presence of the UE can be within compliance of the location policy, or a non-compliance zone, within which the presence of the UE can be not within compliance of the location policy. The UE can be configured to identify a presence of a non-compliance event based on the location data from the UE and location policy of the user profile, including determining that the UE can be at least one of not within the compliance zone, or within the non-compliance zone. The UE can trigger the alert in response to the presence of the non-compliance event.

The system of any of the preceding two paragraphs can include one or more of the following features: The system of Claim 17. The UE can be configured to store environmental layout data for the plurality of RF beacons deployed throughout the designated coverage area. The environmental layout data can include information that uniquely identifies each RF beacon and associates each RF beacon with a distinct location within the designated coverage area. The UE can be configured to receive RF transmissions from at least one RF beacon within the plurality of RF beacons. The received RF transmission signal strength from an RF beacon can be based on its proximity to the UE. To identify the location of the UE, the UE can identify the location based on an analysis of the signal strengths of the at least one RF beacon RF transmission and the environmental layout data. Each UE can be associated with a user profile. The user profile can include a geo-fence boundary within the geo-fence boundary can include at least one of a compliance zone, within which a presence of the UE can be within compliance of the geo-fence boundary, or a non-compliance zone, within which the presence of the UE can be not within compliance of the geo-fence boundary. The system can identify a non-compliance event based on location data determined by the UE and the geo-fence boundary of the user profile based on determining that the UE can be at least one of not within the compliance zone, or within the non-compliance zone. The system can receive a set of user credentials corresponding to a user initiating a session with the UE. The system can retrieve the user profile from a data repository. The user profile can be associated with the user credentials; and associates the user profile with the UE for a duration of the session.

Some embodiments of the present disclosure relate to a non-transitory computer-readable medium storing instructions that, when executed by a processor of a first user equipment (UE), perform a method for dynamically enforcing geographical compliance of the UE through location-based monitoring and event notification. The UE can be part of a plurality of radio frequency (RF) facilitated UEs, each UE of the plurality of UEs configured to communicate with a communications platform server (CPS) over an Internet Protocol (IP) network and to receive RF transmissions directly from any wireless communication node in a collection of wireless communication nodes deployed throughout a designated coverage area. The method can include identifying location data indicative of a location of the UE relative to the designated coverage area. The UE can be associated with a user profile. The user profile can include a location policy that defines geographical boundaries. The geographical boundaries can include at least one of a compliance zone, within which a presence of the UE can be within compliance of the location policy, or a non-compliance zone, within which the presence of the UE can be not within compliance of the location policy. The method can include identifying a presence of a non-compliance event based on the location data and location policy of the user profile. The identifying can include determining that the UE can be at least one of not within the compliance zone, or within the non-compliance zone. The method can include causing issuance of a notification by the UE in response to the presence of the non-compliance event.

The non-transitory computer-readable medium of the preceding paragraph can include one or more of the following features: The method can include storing environmental layout data for a collection of wireless communication nodes deployed throughout the designated coverage area. The environmental layout data can include information that uniquely identifies each wireless communication node and associates each wireless communication node with a distinct location within the designated coverage area. The method can include receiving RF transmissions from at least one wireless communication node within the collection of wireless communication nodes. The received RF transmission signal strength from a wireless communication node can be based on its proximity to the UE. Identifying the location of the UE can be based on an analysis of the signal strengths of the at least one wireless communication node RF transmission and the environmental layout data. Identifying can include assessing compliance of the UE with the location policy by cross-referencing the location data with the geographical boundaries.

The non-transitory computer-readable medium of any of the preceding two paragraphs can include one or more of the following features: The identifying can include determining that the location data indicates the UE has either exited the compliance zone or entered the non-compliance zone. The non-compliance event can be a second non-compliance event. The method can include: identifying a presence of a second non-compliance event; determining that the presence of the second non-compliance event coincides temporally with a permissible absence period; and refraining from issuing a notification for the second non-compliance event. The user profile can define the permissible absence period within the user profile. The permissible absence period permits the UE to be outside the compliance zone or within the non-compliance zone without triggering an alarm for a non-compliance event. The permissible absence period can be dynamically configured based on a schedule associated with the user profile, the schedule can include at least one of designated work hours, break times, or buffer periods. The issuance of the notification by the UE can include triggering at least one of a visual alert, an audible alarm, or a vibrational signal on the UE. The method can include escalating a severity of the notification over time or as the UE moves further away from the compliance zone.

BRIEF DESCRIPTION OF THE DRAWINGS

Throughout the drawings, reference numbers can be reused to indicate correspondence between referenced elements. The drawings are provided to illustrate embodiments of the present disclosure and do not limit the scope thereof.

DETAILED DESCRIPTION

Figure 1:
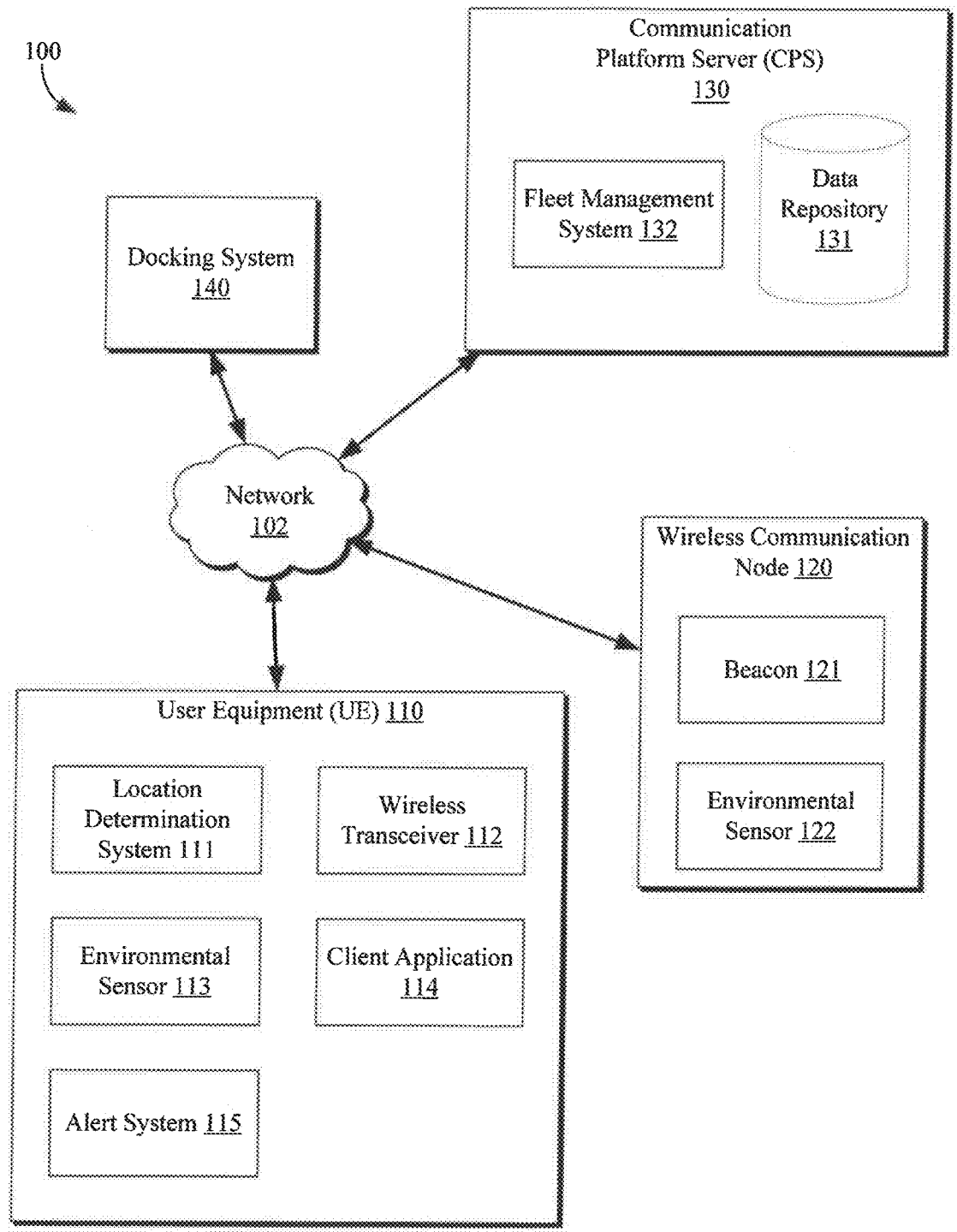
FIG. 1 illustrates a block diagram of a location determination system for determining the location of a user equipment (UE) within a designated coverage area.

Managing fleets of user equipment (UEs) is an important aspect in various industries, enhancing the coordination and operational efficiency of organizations. Traditionally, tracking the location and status of these UEs relies on systems such as GPS. However, GPS technologies often face limitations in both indoor and outdoor environments where signal obstruction and battery consumption issues lead to significant inaccuracies and operational inefficiencies. This limitation underscores the need for more effective UE management methods that can provide precise tracking and monitoring while conserving UE battery life.

The inventive concepts described herein improve the process of managing UEs within a fleet by enabling each UE to independently monitor and report its location and operational status within designated operational areas. For example, each UE can obtain signals from wireless communication nodes or use its internal sensors to determine its location and status. The UE can then selectively communicate this information to a communication platform server (CPS), such as when a change in location or operational status is detected. In this way, the CPS can maintain an accurate record of each UE's location and status without the need for constant data transmission, thereby conserving battery life and reducing overall data consumption.

Some inventive concepts described herein provide mechanisms for issuing alerts and notifications when UEs deviate from their expected locations or operational parameters. Each UE can include an alert system that generates notifications, such as audible alerts, visual alerts, or vibration, to inform users of deviations. By integrating user profiles and predefined operational boundaries, the CPS system can promptly identify and address potential issues, such as UEs being taken off-site unintentionally or not being returned to their designated docking systems. This enhances accountability and ensures efficient fleet management.

Some inventive concepts described herein relate to a fleet management system designed to locate and monitor UEs within designated coverage areas. The system can enable each UE to independently determine its home location, either through a specific charging station or a geo-fenced boundary, and can alert users when the UE is not within its designated home location. By recording each event when a UE enters or exits its home location, and by providing notifications through audio alerts or dashboard updates, the system can ensure that UEs are promptly returned to their proper locations. Additionally, this system can enhance fleet management by tracking operational parameters such as battery status, user assignment, and last known location, thereby facilitating timely intervention and reducing instances of lost or misplaced UEs.

Some inventive concepts described herein relate to tracking and managing UEs to ensure they stay within designated areas. For example, if a UE moves outside of a specified work zone or enters a restricted area, a system can trigger an alert. This may facilitate the return of equipment to its proper place, improving overall management and reducing the risk of lost or misplaced devices. In some cases, the inventive concepts relate to distinguishing between acceptable absences, like lunch breaks, and other non-compliance events that may need immediate attention.

Some inventive concepts described herein represent a notable improvement in the field of fleet management, particularly in enhancing the accuracy and efficiency of UE tracking and monitoring. By enabling UEs to autonomously determine and report their location and status, these inventive concepts refine the approach to managing UEs within complex environments. The disclosed techniques allow organizations to efficiently manage their UE fleets, conserving energy and bandwidth resources while providing reliable tracking and monitoring, thus improving the practical application of these technologies in various operational settings.

System Overview

FIG. 1 illustrates a block diagram of a device management system 100 for monitoring and managing the location of user equipment (UE) 110 within designated coverage areas. The device management system 100 includes the UE 110, a wireless communication node 120, a communication platform server (CPS) 130, and a docking system 140. To simplify discussion and not to limit the present disclosure, FIG. 1 illustrates only one UE 110, wireless communication node 120, CPS 130, and docking system 140, though multiple may be used.

Any of the foregoing components or systems of the device management system 100 may communicate via the network 102. Although only one network 102 is illustrated, multiple distinct and/or distributed networks 102 may exist. The network 102 can include any type of communication network, including RF (Radio Frequency) communication. For example, the network 102 can include, but is not limited to, local area networks (LAN), wide area networks (WAN), cellular networks such as 4G LTE, 5G, HSPA, and 3G, Bluetooth and Bluetooth Low Energy (BLE) protocols, ad hoc networks, satellite networks, wired networks, or wireless networks, such as Internet Protocol (IP) networks. In some embodiments, the network 102 can include the Internet.

Any of the foregoing components or systems of the device management system 100, such as any one or any combination of the UE 110, the wireless communication node 120, the CPS 130, or the docking system 140 may be implemented using individual computing devices, processors, distributed processing systems, servers, isolated execution environments (e.g., virtual machines, containers, etc.), shared computing resources, or so on. Furthermore, any of the foregoing components or systems of the device management system 100 may be combined and/or may include software, firmware, hardware, or any combination(s) of software, firmware, or hardware suitable for the purposes described.

The UE 110 can be a portable, handheld tool. For example, the UE 110 can include, but is not limited to, a smartphone, tablet computer, handheld computer, laptop computer, desktop computer, wearable device, server, portable media player, gaming device, or the like. In some cases, the UE 110 is a dedicated team coordination device. For example, the UE 110 can facilitate team coordination through features such as, but not limited to, two-way radio capabilities, location tracking, messaging, or voice commands. An example UE 110 is the RelayX™ by Relay, Inc. in Raleigh, NC.

The UE 110 can be compatible with a client application 114, which may include, but is not limited to, a web browser, a mobile application or "app," a background process that performs various operations with or without direct interaction from a user, or a "plug-in" or "extension" to another application, such as a web browser plug-in or extension. The UE 110 can include a processor configured to execute instructions. The client application 114 can facilitate various communication functions such as real-time messaging, sending alerts, or tracking locations of UE 110 within the network 102. In some cases, the client application 114 can allow administrators or help desk personnel to communicate directly with the UE 110, such as by sending instructions or alerts, or monitoring activities.

The UE 110 can include a location determination system 111 for determining the location of the UE 110. The location determination system 111 can determine the location of the UE 110 based at least in part on receiving and/or analyzing broadcasts from nearby wireless communication devices 120 (e.g., beacons 121) in known fixed locations. As described herein, the beacons 121 can emit RF signals using technologies like Bluetooth Low Energy (BLE). Upon receiving these signals, the UE 110 can analyze signal characteristics. By processing these signals, the UE 110 can perform triangulation or other proximity analysis to estimate its approximate location within the designated coverage area. This analysis can facilitate an accurate determination of the relative or absolute position of the UE 110 with the designated coverage area. When put into context with the knowledge of the fixed location(s) of the beacons 121, the UE 110 can accurately locate itself using environmental layout data of the designated coverage area.

As described herein, the plurality of RF beacons 121 can be placed around an area to define a geo-fence boundary for the UEs 110. In some cases, the specific location of each RF beacon 121 is known to the CPS and/or the UE 110. In some cases, the UE 110 can utilize these known geofences to determine whether it is within a compliance zone or a non-compliance zone. Upon detecting non-compliance events, the UE 110 can trigger alerts or notifications to inform users or administrators, thereby helping to maintain device accountability and operational efficiency within the fleet management system.

The location determination may be performed by the UE 110 itself, rather than the CPS 130, and the UE 110 can communicate updates to the CPS 130 with its location. Since communicating location updates involves activating a wireless transceiver 112, which consumes power, it can be battery intensive. Additionally, frequent data transmissions utilize bandwidth and increase data usage. By conducting the analysis internally on the UE 110, the UE 110 conserves battery life and reduces data usage by limiting communication with the CPS 130 to updates only. This approach decreases the frequency of communications by the UE 110, thereby conserving battery life and reducing overall data consumption.

In some cases, the UE 110 can include an environmental sensor 113, for example to measure any of various parameters including, but not limited to, barometric pressure, temperature, humidity, light, sound levels, air quality, or electromagnetic field (EMF) strength. In some such cases, the UE 110 can determine or confirm a location determination by utilizing environmental data from its own environmental sensor 113 and the environmental sensor 122 from a wireless communication node 120. By analyzing environmental parameters, the UE can detect patterns and variations characteristic of specific geographical locations or environmental conditions. For example, the UE 110 might identify a particular set of environmental conditions that align with those currently recorded near the wireless communication node 120, supporting the location determined through signal analysis. If the UE 110 estimates that it is closest to a first wireless communication node, the UE 110 can compare the data from an environmental sensor of that first wireless communication node with its own environmental sensor data. If the environmental conditions, such as humidity or barometric pressure, are similar or within a certain threshold, this similarity can confirm the accuracy of the initial location analysis. Conversely, if the environmental data from the UE 110 and the first wireless communication node do not match or satisfy a threshold, the UE 110 can assume that the initial analysis may be incorrect and revise the estimate or consider additional factors to improve the accuracy of the location determination. In some cases, machine learning algorithms can enhance this process by correlating historical and real-time environmental data, allowing the UE 110 to refine its location estimation further.

The UE 110 can include a wireless transceiver 112 that enables it to send and receive information, such as to or from the CPS 130. For example, the UE 110 can send location information to the CPS 130, a process that may vary in frequency based on the dynamics of the environment and its movement. Frequent communication can be power-intensive as it may require the wireless transceiver 112 to be active, thereby consuming significant battery life and bandwidth. However, to reduce battery usage and reduce data consumption, the UE 110 can be configured to send updates according to a predetermined schedule, policy, or algorithm, or only under specific conditions. For example, a frequency-based schedule may dictate that UE 110 signals are communicated at specific intervals, such as such as every X seconds or minutes. As another example, the UE 110 may send location information when certain conditions are satisfied, such as when the UE's location changes by a threshold amount or deviates from an expected location by a threshold amount.

In some cases, the UE 110 can receive environmental layout data via the wireless transceiver 112. For example, the UE 110 may receive environmental layout data from the CPS 130, from a wireless communication node 120, or have it preprogrammed. The environmental layout data can vary across embodiments. In some cases, the environmental layout data includes information that uniquely identifies each wireless communication node 120 and associates each wireless communication node 120 with a distinct location within a designated coverage area. For example, in a situation where the wireless communication nodes 120 are distributed across multiple floors within the multi-story building, the environmental layout data can include indications of a respective floor and area for each wireless communication node 120.

The UE 110 can include an alert system 115 to provide notifications to users about non-compliance events. The alert system 115 can generate various types of alerts, including audible messages, visual signals, or haptic feedback, to inform users when a UE 110 moves outside its designated area or fails to return to its home location. For example, if a UE 110 exits a predefined geo-fence, the alert system 115 can emit an audible alert to prompt the user to return the UE 110.

The alert system 115 can log events in the CPS 130, allowing administrators to review and analyze alert patterns. This logging capability can help identify recurring issues, such as UEs 110 frequently moving out of compliance zones or not being returned to docking systems 140 promptly. By analyzing these patterns, administrators can take proactive measures to address underlying problems and improve operational efficiency.

The alert system 115 can be configured to trigger notifications based on specific conditions, such as low battery levels or unauthorized movement. These notifications can be sent to administrators via email, SMS, or through a centralized dashboard, ensuring that potential issues are addressed promptly. In some cases, if a UE's 110 battery level drops below a certain threshold while it is outside its home location, the alert system 115 can send an alert to prompt the user to return the UE 110 for charging. By enhancing user awareness and prompting corrective actions, the alert system 115 helps maintain UE 110 accountability and supports effective fleet management.

The device management system 100 can include a collection of wireless communication nodes 120 deployed throughout a designated coverage area. A designated coverage area may include various static or dynamic environments, including, but not limited to, retail environments, hospitality venues, corporate offices, educational institutions, single or multi-story buildings, distinct rooms, or floors, and indoor or outdoor settings, including mixed indoor and outdoor environments like campuses, hotels, or commercial centers. In some cases, a designated coverage area can range from a few hundred square feet (e.g., a small retail store) to several acres (e.g., a large hotel complex). In some cases, a designated coverage area can include a multi-story office building with thousands of square feet per floor, or an expansive university campus with numerous buildings and outdoor spaces.

Deployment of wireless communication nodes 120 within a designated coverage area can be guided by specific strategies tailored to the environment's characteristics and intended use. For example, a deployment strategy can include placing the wireless communication nodes 120 such that every point on a predetermined horizontal plane, such as ground level or eye level, within each location of the designated coverage area receives signals from at least one, two, or more wireless communication nodes 120. In more complex configurations, a deployment strategy ensures coverage throughout an entire three-dimensional space of the designated coverage area, covering both horizontal and vertical dimensions. In some such configurations, each vertical and horizontal location of the designated coverage area receives signals from at least one, two, or more wireless communication nodes 120. In some cases, a deployment strategy can include deploying nodes at strategic points, such as near staircases, elevators, or in common areas, to improve signal reach and effectiveness based on architectural layouts and expected user movement patterns.

The quantity of wireless communication nodes 120 within a designated coverage area can be scaled, for example, according to the complexity and size of the designated coverage area or the specific demands of the device management system 100. For example, in smaller, confined spaces such as single-floor retail stores, a few wireless communication nodes 120 (e.g., one or two for each room) may provide adequate coverage and accuracy. Conversely, for larger, more complex environments like hotels, multi-story office buildings or sprawling university campuses, the number of nodes can be significantly higher, potentially extending into the hundreds or thousands. In such cases, the strategic distribution of these wireless communication nodes 120 takes into account not only the vastness of the designated coverage area but also the architectural nuances that might affect signal transmission, such as walls, floors, or large obstacles.

Each wireless communication node 120 can include one or more components to support accurate location determination of a UE 110. These components can include, but are not limited to, a beacon 121 or an environmental sensor 122.

A beacon 121 can be configured to emit radio frequency (RF) signals, for example, using Bluetooth Low Energy (BLE) technology. In some cases, this emission enables the determination of the approximate location of the UE 110 within the designated coverage area by analyzing signals from this beacon 121 and/or other beacons 121 within the vicinity. For example, the beacon(s) 121 can broadcast signals that, when received by the UE 110, facilitate a triangulation process or proximity analysis, thereby facilitating the determination, by the UE 110 or by the CPS 130, of the relative location of the UE 110 within the designated coverage area covered by the beacon network. For example, by analyzing the strength (e.g., Received Signal Strength Indicator (RSSI)), direction (e.g., with technologies like Bluetooth 5.1's direction finding feature), time of flight, phase difference, or other signal characteristics of these signals from one or multiple beacons 121, the location of a particular UE 110 can be estimated relative to the beacons 121. Moreover, the beacons 121 are deployed in known fixed locations which allows a UE 110 to determine its location using its proximity to the beacons.

Although described generally as Bluetooth technology, alternative wireless technologies may also be utilized. Examples include wireless mesh devices operating under standards such as 802.15.4, and Internet-of-Things (IoT) devices. These devices can emit signals across multiple frequency ranges or utilize various wireless protocols, enhancing the network's ability to maintain robust and scalable communications within the designated coverage area.

In some cases, a beacon 121 can be configured to emit RF transmissions at multiple distinct power levels. For example, a beacon 121 can emit first RF transmissions at a first power level (e.g., −30 dBm) and second RF transmissions at a second power level (e.g., 0 dBm). In addition or alternative, a beacon 121 can be configured to emit RF transmissions at multiple frequencies. For example, in some cases, a beacon 121 can emit first RF transmissions at a first frequency (e.g., 2.4 GHz) and a second RF transmissions at a second frequency (e.g., 5 GHz). Emitting at multiple power levels and/or multiple frequencies can facilitate an improved analysis of signal characteristics, which can vary depending on the power level and/or frequency of the transmission. Variations in power levels and/or frequencies can affect the range and penetration of the RF signals. For example, higher power levels may penetrate walls or other objects more effectively than lower power levels. Lower power levels can be better suited for reducing interference and improving signal precision in densely populated areas or environments with many obstacles. Additionally, using multiple frequencies can help mitigate issues such as signal fading and multipath interference, providing a more reliable and accurate signal analysis. This variation introduces by emitting RF signals at multiple power levels or frequencies can provide more comprehensive data on signal attenuation, reflection, and/or interference, enhancing the accuracy of location determination and environmental mapping by allowing the UE 110 to better analyze signal behavior under different conditions. Furthermore, emit RF transmissions at multiple distinct power levels can provide redundancy, improving reliability of signal reception under varying conditions.

In some cases, the beacons 121 can transmit RF signals at intervals determined by predefined criteria. These beacon 121 RF transmissions, sometimes called "pulses", can be scheduled to occur at regular intervals, such as every X seconds or minutes, based on a predetermined schedule, policy, or algorithm. For instance, a frequency-based schedule may dictate that beacon signals are broadcasted at specific intervals to optimize detection and communication with the UE 110. In situations where the UE 110 does not receive an RF transmission of a beacon 121, the UE 110 can infer that it may not be in close proximity to that beacon 121. This lack of signal reception can enable the UE 110 to adjust its location estimation processes or analyze signals from alternative beacons 121 to refine its position within the designated coverage area. Such a mechanism can allow the UE 110 to continually update its location information based on the availability and strength of received beacon signals.

In some cases, a plurality of RF beacons 121 can be strategically placed around an area to define a geo-fence boundary. These RF beacons 121 can be positioned at specific, known locations (e.g., known to the CPS 130 and/or the UE 110), allowing for the precise creation of geographical boundaries. Each RF beacon 121 can emit signals that help establish the limits of compliance zones and non-compliance zones within the designated area. The signals from these beacons 121 may be monitored, enabling accurate tracking and management of movement of UEs 110 within and/or proximate to the geo-fence. In some cases, a geo-fence is defined by other methods such as GPS coordinates, Wi-Fi triangulation, or the use of physical landmarks or barriers.

An environmental sensor 122 can measure any of various parameters including, but not limited to, barometric pressure, temperature, humidity, light, sound levels, air quality, or electromagnetic field (EMF) strength. The environmental sensor 122 can include, but is not limited to, a barometric pressure sensor, a temperature sensor, a humidity sensor, a photodetector or light sensor, a sound or noise level meter, an air quality sensor, or an EMF meter. In some cases, in addition to the wireless communication node 120 including an environmental sensor 122, the UE 110 can also include an environmental sensor 122. In some such cases, the environmental sensor 122 of the UE 110 can be the same or similar to that of the environmental sensor 122 of the wireless communication node 120. In this way, the UE 110 can compare its environmental data with that of the wireless communication node 120, providing a factor to confirm or determine the location of the UE 110. In some cases, by comparing environmental conditions, the UE can verify and refine its proximity estimation.

In some cases, the environmental sensor 122 can include or more sensors configured to detect changes within their immediate surroundings, such as movement or the proximity of an object or individual. Such environmental sensors can include, but are not limited to, proximity or motion sensors. When these sensors detect changes, they generate data that can indicate the presence of an individual (potentially the user of the UE 110) within a specific proximity to the corresponding wireless communication node 120. Although possibly not conclusively verifying the specific location of the UE 110, this data can contribute an additional layer of information for location analysis. For example, it can be factored into the broader process of location determination, offering another dimension of evidence that supports the inference of the proximity of the UE 110 to a specific wireless communication node 120. This multi-faceted approach to gathering and analyzing data can serve to refine the overall capacity of the UE 110 for providing accurate location determinations.

In some instances, the beacon RF transmissions can include data indicative of environmental conditions, sourced from environmental sensor 122. By incorporating environmental sensor data into these RF transmissions, the beacon 121 can allow the UE 110 to gain insights into the surrounding environmental conditions. In some instances, environmental sensor data can be transmitted via signals other than RF transmissions.

The CPS 130 can manage and facilitate data exchanges between the UE(s) 110, the wireless communication node(s) 120, and/or itself. The CPS 130 can process and store location data, enabling real-time or near real-time location services through its interfaces with UEs and wireless communication nodes across multiple network protocols, ensuring efficient data transfer necessary for accurate location determination.

The CPS 130 can communicate bidirectionally with UEs to receive and/or transmit location data, allowing it to maintain and update a dynamic map indicative of UE positions within the designated coverage area. The CPS 130 can generate and update environmental layout data, which includes detailed mappings of wireless communication node 120 deployments and their associated identity and location data within the designated coverage area.

The CPS 130 can support the operation of a Dashboard, an administrative tool used to manage and configure communication devices and user settings. This Dashboard can provide functionalities for visualizing real-time location data, monitoring user activity, and managing alerts. It can allow administrators to deploy and manage communication networks, ensuring device functionality and effective coordination of team members.

The CPS 130 can facilitate the functionality of an app, such as the client application 114. In some such cases, the client application 114 can be implemented as a smartphone application designed for managers to oversee team communications. This client application 114 can support real-time messaging, alert sending, and location tracking of team members. The client application 114 can allow managers to communicate directly with their team, send instructions, and monitor activities.

The CPS 130 can include a data repository 131 for storing environmental layout data and/or location data relevant to UEs 110 of one or more designated coverage areas. For example, the data repository 131 can maintain mappings that include unique identifiers and precise location data for each wireless communication node 120.

The CPS 130 can include a fleet management system 132. The fleet management system 132 can manage and monitor the location and status of electronic devices, such as UE 110, within a designated coverage area. The fleet management system 132 can process location data received from a UE 110 and wireless communication nodes 120, maintaining an accurate and up-to-date record of each UE's 110 position and operational status. When the UE 110 enters or exits a compliance zone and/or a non-compliance zone (e.g., a predefined geo-fence), the fleet management system 132 can log this event and update the UE's 110 status accordingly. Additionally, the fleet management system 132 can monitor battery levels, usage patterns, or operational status of the UEs 110.

The fleet management system 132 can generate detailed reports on UE 110 usage, location history, or operational status. These reports can provide administrators with insights into the overall efficiency of the fleet, helping to identify patterns such as frequent non-compliance events or UEs 110 with consistently low battery levels. By analyzing these reports, administrators can make informed decisions to optimize UE 110 deployment, ensuring that all UEs 110 are effectively utilized and that operational issues are promptly addressed.

The fleet management system 132 can facilitate real-time alerts and notifications based on predefined compliance zones. If a UE 110 moves outside its authorized area or fails to return to the docking system 140 within a specified time frame, the fleet management system 132 can trigger alerts to notify users of the UE 110 and/or administrators. These alerts can be configured to be sent through the UE 110 itself, or via email, SMS, or through a centralized dashboard, enabling quick response to potential issues. In some cases, the fleet management system 132 can distinguish between acceptable non-compliance events, such as scheduled breaks, and non-compliance events that may require immediate attention. By integrating these capabilities, the fleet management system 132 helps to reduce instances of lost or misplaced UEs 110 and enhances overall fleet management.

The fleet management system 132 can also support compliance monitoring by defining high-risk periods when non-compliance events are more likely to occur, such as the end of a worker's shift or entry into restricted areas. During these periods, the fleet management system 132 can escalate alerts to ensure prompt corrective actions. In this way, the fleet management system 132 can improve UE accountability and operational efficiency, increasing the likelihood that UEs 110 will be used properly and returned to their designated locations.

The docking system 140 can provide a designated home location for the fleet of UEs 110, offering a specific spot for charging and/or secure storage. When the UE 110 is placed in the docking system 140, the UE 110 can interact with the fleet management system 132 to confirm its presence and update its status to indicate it is charging. In some cases, the UE 110 performs this interaction directly. In other cases, the docking system 140 communicates with the fleet management system 132 to verify the docking status.

The docking system 140 can be implemented with specific hardware designed for secure device storage and charging. The docking system 140 may include charging connectors compatible with various types of the UE 110, LED indicators to show charging status, and secure locking mechanisms to prevent unauthorized removal. In some cases, the docking system 140 can be intelligent, equipped with communication modules to interface with the CPS 130. This intelligent docking system can send status updates, detect anomalies, or trigger alerts if the UE 110 is not docked correctly. In other cases, the docking system 140 may be a simpler, non-communicating unit, such as one that relies on physical interaction for status verification.

The docking system 140 can have different configurations to accommodate various operational needs. For example, the docking system 140 can be an RFID-enabled box that detects the presence of each UE 110 via its unique RFID tag. The docking system 140 can have specific compartments for each UE 110, ensuring that each device is placed in its designated spot. Alternatively, the docking system 140 can feature a communal compartment where multiple UEs 110 are stored together. In such a setup, the docking system 140, or the UE 110 itself, may verify the presence of each UE using unique IDs and update the fleet management system 132 accordingly.

The docking system 140 can contribute to location tracking by verifying when the UE 110 is seated in its docking system. This verification process can include recording the time a UE 110 was docked and undocked, providing administrators with a clear log of device usage and return patterns. If a UE 110 is not docked within a specified period, the docking system 140 can generate an alert to prompt a check on the UE's 110 status and location.

In some cases, the docking system 140 can be integrated with its own alert system 115 to enhance device management. In some such cases, if a UE 110 fails to return to its docking system within a designated time frame, the docking system 140 can trigger notifications to inform administrators. These notifications can include details such as the UE's 110 last known location, user assignment, and battery status, enabling timely interventions to locate and return the UE 110. By providing a reliable and organized method for managing device returns and charging, the docking system 140 supports the readiness and accountability of the fleet.

Figure 2:
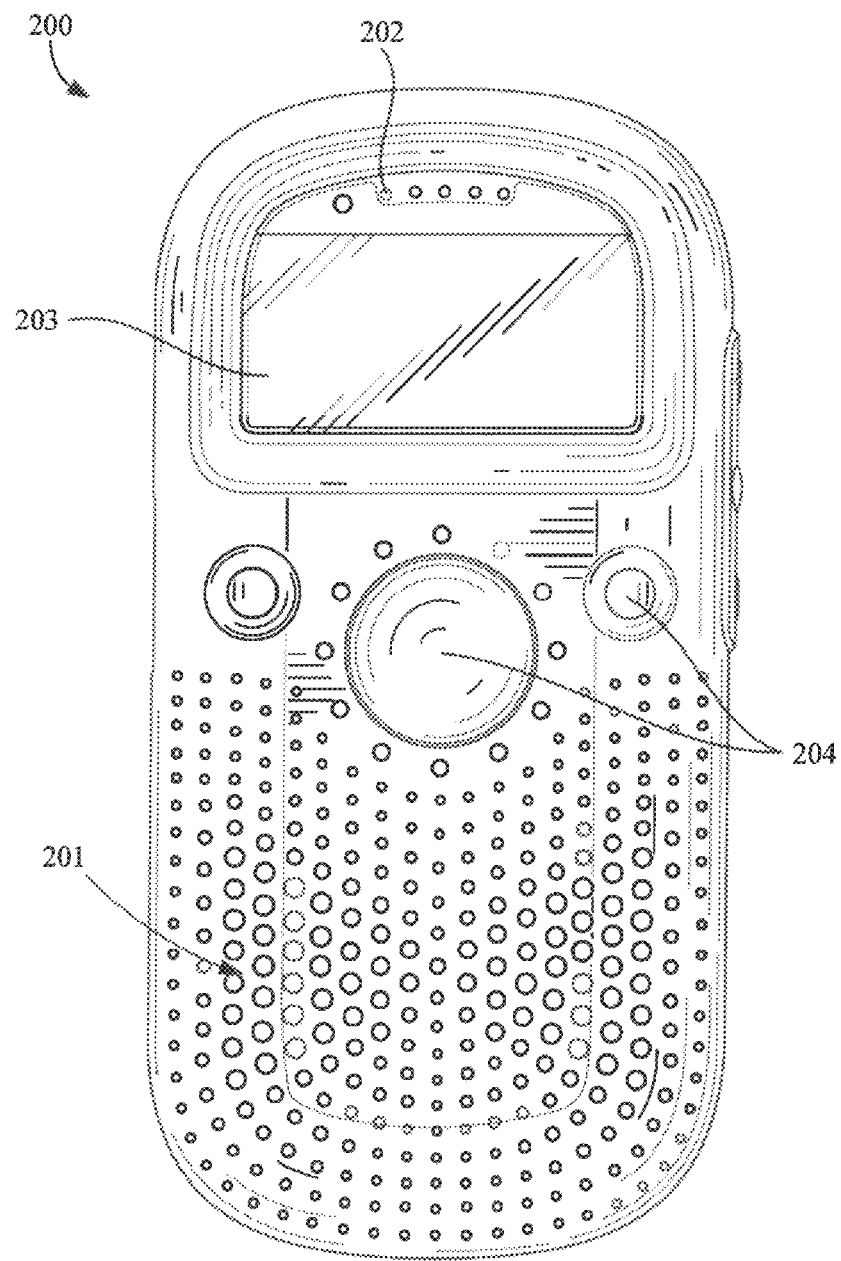
FIG. 2 depicts an example of a UE, according to some embodiments of the inventive concepts.

FIG. 2 depicts an example of a UE 200, according to some embodiments of the inventive concepts. It will be appreciated that the UE 200 may be an embodiment of the UE 110 of FIG. 1. As described herein, the UE 110 can be configured to support communication and operational functionalities across diverse industries. For example, the UE 200 can facilitate two-way communication, location tracking, and/or real-time data exchange.

The UE 210 can be designed with a compact and durable form factor, suitable for use in environments that demand robust handling and frequent use. The UE 200 can include a speaker 201, microphone 202, a display screen 203, a device interface (not shown) for coupling with external accessories such as, for instance, a headset, and a user interface that may include buttons 204 and/or a touchscreen component of the display screen 203.

Consider a scenario in a hotel environment where a collection of UE 200 devices is deployed and distributed among the housekeeping staff. Each housekeeper can be assigned specific hotel rooms as part of their daily cleaning rounds. The individual UE 200 devices enable housekeepers to communicate with each other, allowing them to coordinate tasks efficiently, request supplies, or call for assistance when needed. Furthermore, the location of each UE 200 can be tracked or determined for indoor room-level positioning. In this way, hotel management can monitor the locations of staff via the client application 114 or a Dashboard, ensuring that all assigned rooms are being attended to promptly. Hotel management can also use this data to analyze the time each staff member spends in each room, helping to identify any inefficiencies or deviations from expected cleaning times. In this way, the device management system 100 can improve operational efficiency by ensuring staff accountability and helping management meet guest expectations for room readiness and cleanliness.

Figure 3:
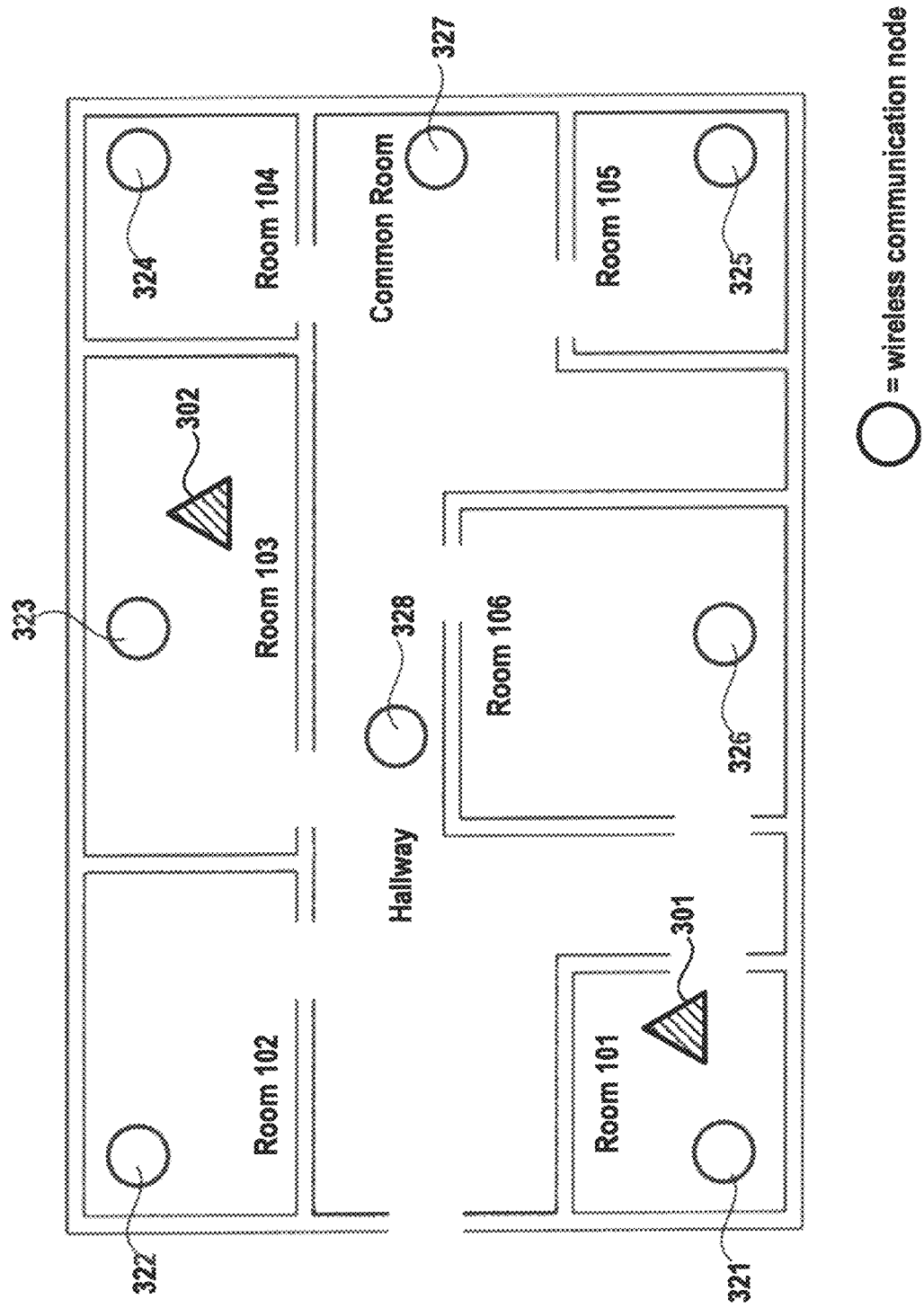
FIG. 3 illustrates an example floor plan displaying example placement of wireless communication nodes within a first-floor building layout.

FIG. 3 illustrates a floor plan displaying example placement of wireless communication nodes 321, 322, 323, 324, 325, 326, 327 within a first-floor building layout. The wireless communication nodes, indicated by circles, are distributed across various rooms and common areas to improve location determination capabilities of the UEs 301 and 302. In this example, Rooms 101, 102, 103, 104, 105, and 106, as well as the common room 107 and hallway 108, are each equipped with one wireless communication node. Though each room is depicted as having one corresponding wireless communication node, it will be appreciated that, in some cases, a room may have no wireless communication nodes, or may have more than one. In some cases, the wireless communication nodes are distributed throughout the floor layout such that each location of the designated coverage area (i.e., the floor plan) receives signals from at least two wireless communication nodes 120.

A non-limiting example of a data structure for storing environmental layout data for wireless communication nodes within the first floor of the building is illustrated in Table 1. Each entry in the table specifies the Node ID, Room Number, and the Coordinates (X, Y) of each node, along with a descriptive text about its placement. In this example, the coordinates represent a wireless communication node's location within the room, measured in meters from a defined origin point, typically the entrance or a corner of the room. In some cases, such a coordinate system can allow a UE to accurately triangulate its position relative to these fixed nodes, thereby achieving precise indoor localization. The Description column offers additional insights into each node's strategic placement, aiding in understanding the wireless communication node's function and its impact on network coverage and signal strength within the specified areas. It will be appreciated that the data structure can vary across environments and may include fewer or different pieces of information depending on specific operational requirements or configurations.

TABLE 1

Environmental Layout Data for Wireless Communication Nodes

| Node ID | Room Number | Coordinates (X, Y) | Description |
|---|---|---|---|
| 321 | 102 | (5, 5) | Near the entrance |
| 322 | 103 | (3, 10) | Center of the room |
| 323 | 103 | (10, 15) | Next to the window |
| 324 | 104 | (2, 8) | Adjacent to the door |
| 325 | 105 | (6, 18) | Near the rear wall |
| 326 | 106 | (12, 3) | Beside the workstation |
| 327 | Common Room | (9, 22) | Center of the room |
| 328 | Hallway | (15, 10) | Near the intersection |

As a non-limiting example, UE 301 can communicate with some of the wireless communication nodes to determine that it is in Room 101. For example, in some cases, the UE 301 may only communicate with the nearest wireless communication nodes, which in this case could include wireless communication nodes 321 in Room 102 and possibly node 326 in Room 106, depending on the specific range and configuration of the wireless communication node. The UE 301 can use signals from these wireless communication nodes 321, 326 to determine its position within Room 102 accurately. Similarly, UE 302 can communicate with some of the wireless communication nodes to determine that it is in Room 103.

Location Tracking in the User Equipment

Individuals in various settings can carry user equipment (UE), which enables the tracking of their locations. This capability is beneficial for multiple applications, including security and operational management. Conventionally, location determination tasks are centralized, managed at the server level by the CPS 130. In such a setup, a collection of wireless communication nodes 120 is deployed across a designated coverage area, and a UE 110 periodically collects data from these beacons. This information is transmitted to the CPS 130 at regular intervals, such as every 60 seconds, and the CPS 130 then determines the position of the UE 110 based on the received data. However, frequent transmission to the CPS 130 by the UE leads to substantial battery consumption and significant bandwidth usage due to the regular activation of the UE's wireless transceiver 112.

Some inventive concepts described herein relate to shifting the responsibility for location determination tasks from the CPS 130 to the UE 110. This shift allows the UE 110 to independently process and determine its own location within its environment, rather than relying on the CPS 130. The UE 110 obtains environmental layout data, which includes the identities and locations of wireless communication nodes 120. The UE 110 then scans for signals from these wireless communication nodes to accurately determine its location. Although the CPS 130 may still monitor the locations of the UEs 110 for overall system awareness, this approach can significantly reduce the frequency of communications between the UE 110 and the CPS 130. For instance, the UE 110 may only send updates to the CPS 130 when its location changes by a specified threshold amount or deviates from an expected path or timeline by a similar margin. By transferring the location determination responsibilities to the UE 110 and decreasing the frequency of updates it sends to the CPS 130, these inventive concepts advantageously improve energy consumption and bandwidth usage.

Practical applications of these concepts are particularly valuable in various settings, such as in the hospitality industry, where precise location tracking can significantly enhance operational efficiency. For example, in a hotel environment, a collection of UE 110 devices can be distributed among housekeeping staff to facilitate effective monitoring of staff movements. Using techniques described herein, each UE 110 can track a housekeeper's indoor room-level positioning, ensuring they attend to their assigned rooms and adhere to their cleaning schedules. By enabling UEs to independently handle their location updates, frequent data exchanges over networks are reduced, which improves resource utilization and reduces operational costs.

Figure 4:
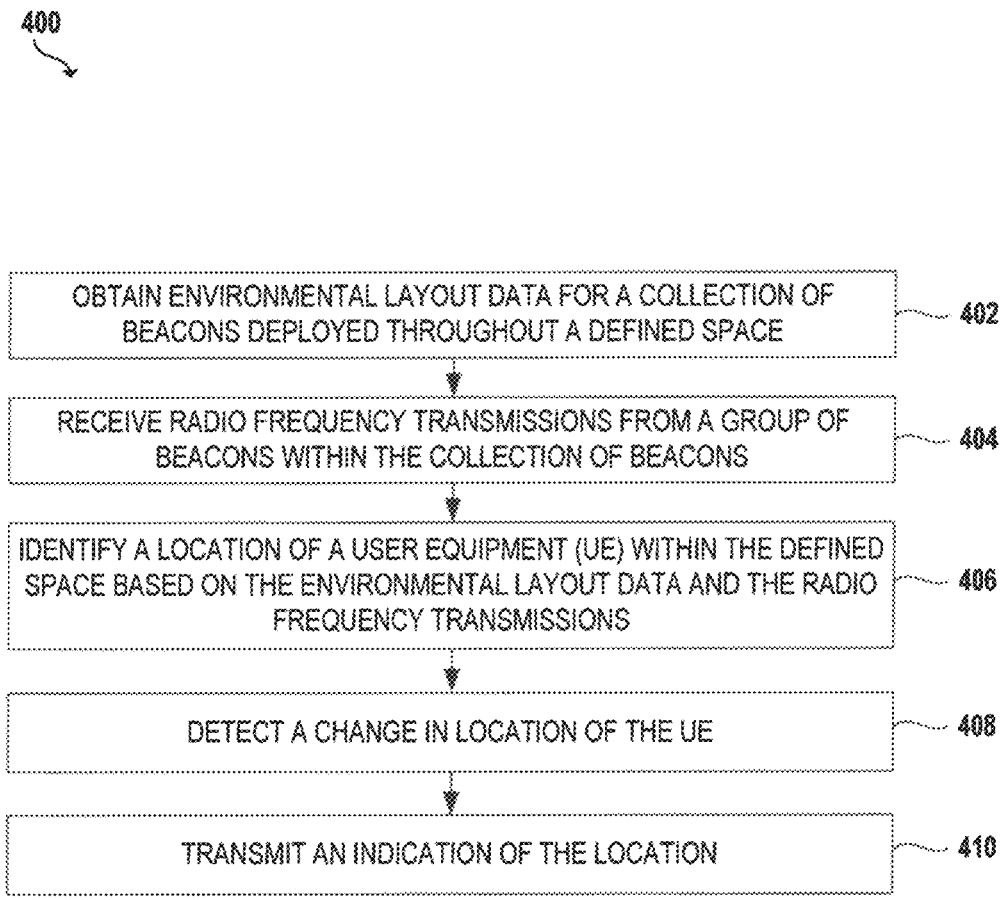
FIG. 4 presents a flow diagram illustrating an embodiment of a routine, implemented by a UE, located within a designated coverage area.

FIG. 4 presents a flow diagram illustrating an embodiment of a routine 400, implemented by a UE 110, within a designated coverage area. The diagram outlines the process by which the UE 110 determines its own location by interacting with collection of wireless communication nodes 120 deployed throughout the designated coverage area. Although described as being implemented by the UE 110, it will be understood that one or more elements outlined for routine 400 can be implemented by one or more computing devices/components that are associated with the device management system 100, such as the CPS 130 or other network systems involved in managing and distributing environmental layout data. Thus, the following illustrative embodiment should not be construed as limiting.

At block 402, the UE 110 obtains or stores environmental layout data for collection of wireless communication nodes 120 deployed throughout the designated coverage area. As described herein, the designated coverage area can be a predefined spatial region such as, but not limited to, one or more floors of single or multi-floor build, like a hotel, hospital, retail store, or complex. As described herein, in some cases, the wireless communication nodes 120 can be strategically deployed throughout the designated coverage area to ensure that, as the UE 110 moves around the designated coverage area, the UE 110 remains within the range of the signals from at least one wireless communication node 120 at all times. In some cases, the wireless communication nodes 120 may be deployed such that the UE 110 remains within the range of the signals from at least two or at least three wireless communication nodes 120 at all times.

As described herein, environmental layout data can include information about locations, identifiers, and/or coverage areas of wireless communication nodes 120 within the designated coverage area. The UE 110 may obtain the environmental layout data from different sources, depending on the embodiment. In some cases, the UE 110 receives this environmental layout data from the CPS 130. For example, the CPS 130 can supply the environmental layout data when the UE 110 first enters the designated coverage area or as needed if the UE 110 requests updates to accommodate changes like additional nodes or adjusted node configurations. In some cases, the UE 110 may receive or obtain the environmental layout data directly from one or more of the wireless communication nodes 120 themselves. For instance, the wireless communication nodes 120 might include the environmental layout data as part of their regular signal broadcasts, enabling the UE 110 to update its information dynamically as it moves within the designated coverage area. In some cases, the environmental layout data can be downloaded from a database, such as one maintained by the CPS 130, or the environmental layout data may be preprogrammed into the UE 110 prior to deployment.

At block 404, the UE 110 receives radio frequency (RF) transmissions from a group of wireless communication nodes 120 within the collection. As described, depending on its location within the designated coverage area, the UE 110 may only receive transmissions from a subset of the wireless communication nodes at any given time. For example, some RF transmissions by some wireless communication nodes 120 may not reach the UE 110 due to distance limitations or physical obstructions such as walls or other barriers. This variability in signal reception can be important to mapping the UE's movement and/or determining the location of the UE 110 relative to the wireless communication nodes 120.

In some cases, each wireless communication node 120 can be configured to emit RF transmissions at only one distinct power level, or at only one frequency. However, in other scenarios, each wireless communication node 120 can be configured to emit RF transmissions at multiple distinct power levels or at multiple distinct frequencies.

In some cases, the RF transmissions include environmental sensor data associated with respective wireless communication nodes 120. For example, a wireless communication node 120 may include an environmental sensor 122. In some such cases, the environmental sensor 122 can include, but is not limited to, a barometric pressure sensor, a temperature sensor, a humidity sensor, a light sensor, a proximity sensor, a motion sensor, or the like.

At block 406, the UE 110 identifies its location within the designated coverage area based on the RF transmissions received from the wireless communication nodes 120. Identifying the location can include assessing one or more signal characteristics of the RF transmission signals. The one or more signal characteristics can include, but are not limited to, signal strength, direction, time of flight, or phase difference.

In some cases, the UE 110 uses information relating to signal strength to determine its location. For example, the UE 110 can measure the intensity of RF transmissions received from the wireless communication nodes 120. Because signal strength decreases as the distance from the source increases, this measurement can be used to estimate the UE's proximity to each wireless communication node 120. If the signal from a particular wireless communication node 120 is stronger, it suggests that the UE 110 is closer to that wireless communication node 120. By collecting signal strength data from multiple wireless communication node 120, the UE 110 can use that information to determine its position within the designated coverage area.

In some cases, the UE 110 utilizes information about the direction of incoming signals to ascertain its location. This can involve technologies like beamforming or the use of directional antennas that detect the angle from which signals are received. By determining the direction from which each signal arrives, the UE 110 can deduce its relative position to multiple wireless communication node 120, aiding in the refinement of its location within the designated coverage area, particularly useful in environments where signals may be obstructed or deflected.

In some cases, the UE 110 calculates its distance from a wireless communication node 120 based on the time of flight of RF signals. This can include measuring the time it takes for a signal to travel from a wireless communication node 120 to the UE, using the known speed of light to convert this time into distance. When the UE 110 receives time of flight data from several wireless communication node 120, it can employ multilateration techniques to determine its location by finding the point where these distances intersect.

In some cases, the UE 110 determines its location by analyzing the phase difference of the received RF signals. This approach can include measuring the phase shift that occurs as signals travel from a wireless communication node 120 to the UE. By comparing the received phase with the phase at the time of signal transmission, the UE 110 can estimate the distance traveled by the signal, which, when combined with similar data from other wireless communication node 120, enhances the accuracy of location determination. Such a technique can be beneficial in areas where direct signal paths are disrupted, allowing the UE 110 to effectively navigate complex signal environments.

In some cases, the identification of the location of the UE 110 is further based on, or alternatively based on, the environmental sensor data. For example, the UE 110 can be equipped with an environmental sensor 122 that can measure parameters such as barometric pressure, temperature, humidity, light, sound levels, air quality, or electromagnetic field (EMF) strength. Utilizing this environmental data, the UE 110 can enhance its location determination by comparing its sensor readings with data from similar sensors in nearby wireless communication nodes 120. If, for instance, the environmental conditions detected by the UE 110 match closely with those recorded by a specific node's sensors—like matching humidity levels or barometric pressures within a predefined threshold—this congruence can validate and reinforce the accuracy of the calculated position. Conversely, significant discrepancies in environmental data between the UE 110 and the wireless communication node might indicate an error in the initial location estimate, prompting the UE 110 to adjust its calculation or to utilize additional data inputs.

In some cases, wireless communication nodes 120 are configured to emit RF signals at multiple distinct power levels and/or frequencies. For instance, a wireless communication node 120 might transmit signals at a first power level of −30 dBm and a second, higher power level of 0 dBm, or at varying frequencies like 2.4 GHz and 5 GHz. The use of varied power levels and/or frequencies can allow the UE 110 to receive signals under different conditions and analyze how these signals behave as they travel through the environment.

Utilizing these different power levels and/or frequencies, the UE 110 can determine its location, for example by analyzing how the signals degrade or alter as they travel. Higher power levels might demonstrate effective penetration through dense materials or long distances, while lower power levels can be beneficial for reducing interference in crowded signal environments. The differing frequencies can assist in managing issues such as fading and multipath interference from environmental reflections. By analyzing signals received at these varied settings, the UE 110 can more accurately determine its position within the designated coverage area.

In some cases, the UE 110 employs a combination of techniques to determine and verify its location within the designated coverage area. For example, by utilizing signal strength, direction, time of flight, phase difference, and/or environmental sensor data, the UE 110 can analyze the conditions and characteristics of the received signals. Such a multifaceted approach can allow the UE 110 to adapt its location determination strategies based on the most reliable and relevant data available. For instance, it might weigh signal strength more heavily in open areas while relying more on phase difference or direction in structurally complex environments.

In some cases, the UE 110 can be configured to run a Hidden Markov Model to process and smooth data received from wireless communication nodes or Wi-Fi signals over time. Such a statistical model can help in managing the transitions between different states of signal reception, effectively reducing location flapping—a scenario where the indicated location of the UE 110 fluctuates erratically due to variations in signal quality or interference. By applying a Hidden Markov Model, the UE 110 can predict the most probable location state transitions based on the sequence of observed signal data.

In some cases, the UE 110 can utilize a trained machine learning model to improve the accuracy of its location determination. A trained model can be configured to process inputs such as any combination of signal strength, direction, time of flight, phase difference, environmental sensor data, or historical movement patterns of the UE 110 within the designated coverage area.

In some cases, the trained model can produce a probability distribution of potential locations for the UE, quantifying the likelihood of the UE 110 being at various points within the designated coverage area. This output can allow for a nuanced assessment of the most probable position of the UE 110 based on current and/or historical data. In some cases, the trained model can identify and disregard improbable location readings, such as those suggesting movement through physical barriers or abrupt changes across large distances. For example, if the UE 110 consistently registers data indicating it is on a specific floor of a building and suddenly an outlier data point suggests it has moved to a different floor or passed through a wall, the trained model can assess this as highly unlikely and assign a low probability to such a location.

The trained model may be adaptive, incorporating new data over time to refine its predictive accuracy. This continuous learning process can be valuable in dynamic environments where physical conditions and signal characteristics may evolve, such as in areas undergoing construction or where temporary obstructions are introduced. By adjusting its parameters in response to new environmental and signal data, the trained model can allow the UE 110 to maintain reliable location determination abilities.

The resolution of the determined location by the UE 110 can vary in precision and specificity depending on the configuration and requirements of the designated coverage area. For instance, in some scenarios, the identified location may simply indicate the room or area where the UE 110 is expected to be, or the wireless communication node 120 that the UE 110 is nearest to. In some cases, the location might be defined by precise coordinates within a specific room or a more granular area, providing a higher resolution of the UE's position.

At block 408, the UE 110 can determine whether there is a change in its location and, if so, whether that movement is significant enough to warrant an update to the CPS 130. In some cases, the UE 110 can determine the change by assessing its current location and comparing it to a previously recorded location. For example, an update might be deemed necessary if it is determined that the UE 110 has moved more than X meters within Y seconds, suggesting a transition from one predefined area to another, or that the UE 110 has moved from one room to another or across different building levels.

In some cases, the UE 110 can flag unexpected movements that do not align with typical movement patterns, such as the UE 110 appearing to move through physical barriers or covering an unusually large distance in a brief period. In some cases, the UE 110 can be configured to trigger updates to the CPS 130 only when the UE 110 crosses predefined thresholds, such as entering or exiting designated zones or exceeding specific movement parameters.

At block 410, the UE 110 transmits an indication of its location to the CPS 130. In some cases, the UE 110 transmits an indication of its location to the CPS 130 by including specifics such as "3rd floor, Room 318," rather than a comprehensive set of location data. Such a focused approach to transmitting location updates can conserve LTE data and reduce network load by sending only minimal information to convey the location. Alternatively, in some cases, the UE may transmit more complete location data, which could include, but is not limited to, detailed coordinates or extended data about the surrounding environment.

In some cases, the UE transmits the indication by activating a wireless transceiver 112, which can send the data via LTE, Wi-Fi, or other available wireless communication methods. As mentioned, the transmission can be triggered once the UE determines that a significant location change has occurred and should be communicated to the CPS 130 to maintain an accurate and up-to-date database of locations for all UEs 110 within the device management system 100. This data exchange can allow the CPS 130 to track the movement of UEs 110 across the designated coverage area effectively, updating its records to reflect the most recent positions.

In some cases, a UE 110 can store more frequent data of its location than it passes to the CPS 130 since not all location data is automatically sent from the UE 110 to the CPS 130 in normal operation. This additional data may be uploaded to the CPS, for instance, once the UE has been placed into a charging unit at the end of a shift. While charging, the UE 110 may upload the additional location data to the CPS 130 where it may be stored for later analysis.

It will be understood that fewer, more, or different blocks can be used as part of the routine 400 of FIG. 4. For example, in some cases, if the UE 110 is unable to determine its location using the techniques described herein, the UE 110 may activate its GPS to ascertain its position. This scenario may arise when the UE finds itself outside the effective range of the indoor positioning signals or when the indoor signals are insufficiently reliable due to environmental factors. Once the GPS is activated and a location is successfully determined, the UE 110 can send this information to the CPS 130, ensuring that location tracking remains continuous and accurate. Conversely, if the UE can determine its location using the disclosed techniques without relying on GPS, the UE 110 can deactivate or keep the GPS turned off to conserve battery life. This selective use of GPS based on the necessity for accurate data helps optimize power consumption while maintaining precise location tracking capabilities.

Location of Lost Devices

Organizations can use a fleet of UEs 110 to support their operations throughout the day. In some cases, the UEs 110 can be part of a shared pool, where a particular UE 110 may not be pre-assigned to an individual; rather, any UE 110 may be selected from the shared pool and assigned to an individual, such as for that individual's shift. For example, when individuals start their shift, they can check out a UE 110 from the pool of available devices by assigning their user profile to it, such as by tapping an NFC chip (e.g., integrated in their badge) to the UE 110.

A user profile allows the system 100 to link the UE 110 to a specific individual, enabling tracking of the UE 110 and accountability during their shift. The user profile can include details such as, but not limited to, the individual's identity, assigned work area, schedule, or a user-specific location policy that sets geographical limits for the specific individual. In some cases, the location policy can define one or more compliance zones, within which the individual is expected to be during their shift, for example, based on their job title, function, schedule, assigned tasks, etc. For example, if a hotel cleaner is assigned to specific floors and rooms for their shift, those areas may be considered compliance zones. If the individual moves outside these zones, such as leaving the hotel or entering unauthorized floors, a non-compliance event may be detected. In some cases, the location policy can define one or more non-compliance zones, where the individual is not expected or permitted to be during their shift. For example, a non-compliance zone may be defined as an area the individual is not permitted or expected to enter, or a boundary they are not permitted or expected to cross. For a hotel cleaner, a non-compliance zone may include guest areas, administrative offices, or a geo-fence around the perimeter of the hotel property. If the individual moves into these areas and/or crosses the boundary, such as by leaving the hotel or entering unauthorized floors, the system 100 can detect a non-compliance event.

As detailed herein, a UE 110 is capable of self-determining its location and communicating updates to the CPS 130, particularly if its movement warrants CPS 130 notification. By conducting the determination internally on the UE 110, the UE 110 conserves battery life and reduces data usage by reducing the number of communications with the CPS 130.

The CPS 130 may oversee the location policies for all the UEs 110 and assesses compliance of a specific UE 110 with the location policy associated with the active user profile. For instance, the CPS may cross-reference the location of the UE 110 with designated compliance and non-compliance zones to detect non-compliance events, triggering a notification (e.g., an audible alert) from the UE 110 when such an event occurs. Conversely, in some scenarios, the UE 110 manages its own compliance with the location policy and triggers alerts independently when non-compliance events are detected. In such cases, the UE 110 may be configured with any location and/or compliance policies associated with the active user profile.

By monitoring compliance and non-compliance zones, the system advantageously reduces the likelihood of UEs not being returned to the docking system 140 before their batteries deplete. This enhances device accountability, conserves battery life, and minimizes the risk of lost or misplaced devices. It ensures efficient fleet management and operational continuity by providing accurate and timely information, facilitating prompt corrective actions, and reducing the time and resource expenditures needed to locate missing devices.

Figure 5:
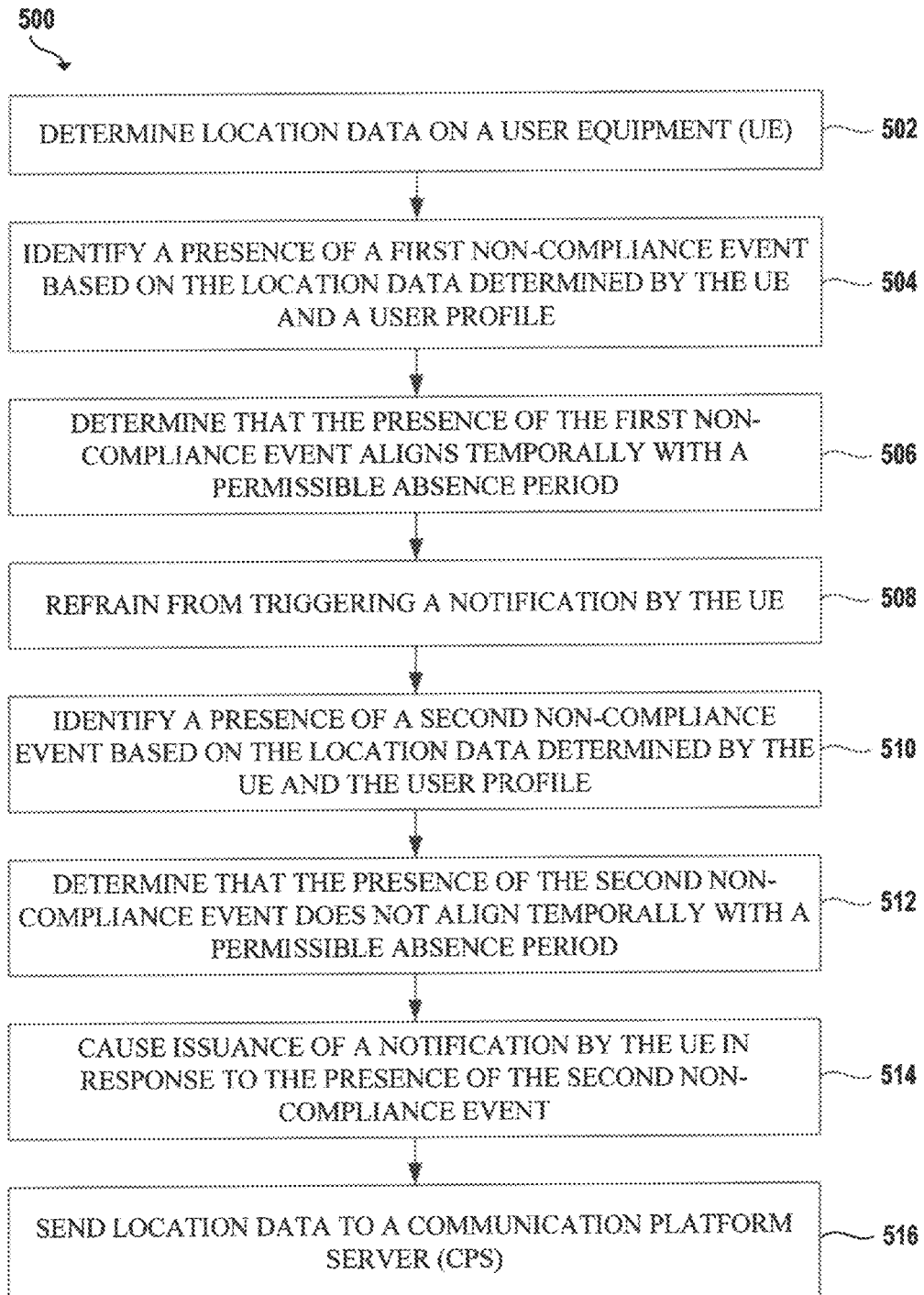
FIG. 5 presents a flow diagram illustrating an embodiment of a routine for processing and analyzing data from a UE to determine compliance with predefined operational parameters.

FIG. 5 presents a flow diagram illustrating an embodiment of a routine 500 for processing and analyzing data from a UE 110 to determine compliance with predefined operational parameters. Although described as being executed by the UE 110, it will be understood that one or more operations detailed in routine 500 can be performed by various computing devices/components within the device management system 100, such as the CPS 130. Thus, the following illustrative embodiment should not be construed as limiting.

At block 502, the UE 110 identifies location data. The location data can be indicative of a location of the UE 110 relative to a designated coverage area. In some cases, the UE 110 can determine the location data using a process similar to that described in routine 400. For example, the UE 110 can obtain environmental layout data indicating the positions of wireless communication nodes 120, receive RF transmissions from these nodes, and determine its own location based on the RF transmissions.

At block 504, the UE 110 identifies the presence of a first non-compliance event based on the location data and a user profile. As described herein, a UE 110 can be loaded with a user profile that includes a location policy, which can set geographical restrictions for a specific individual. The location policy can define whether an individual, using the UE 110 as their proxy, is within an allowed area. The location policy can define one or more compliance zones and/or one or more non-compliance zones.

A compliance zone can be an area within which the presence of the UE 110 is in compliance with a location policy. Examples of compliance zones can include, but are not limited to, designated work areas such as office buildings, manufacturing facilities, construction sites, or other specified locations where the UE 110 is expected to be during work hours. In some cases, the boundaries of a compliance zone can be established based on organizational requirements and operational protocols. In some cases, the boundaries of a compliance zone may be configured according to hierarchical levels within the organization, allowing different access permissions and compliance zones for various roles or departments. Compliance zones may extend to specific floors within a multi-story building or distinct sections within a large facility, or can be defined within or outside of a geofence, providing granular control over permissible areas.

A non-compliance zone can be an area where the presence of the UE 110 is not in compliance with the location policy. Examples of non-compliance zones can include, but are not limited to, unauthorized locations within the workplace, such as restricted areas or offices not assigned to the individual. In some cases, the boundaries of a non-compliance zone can extend to adjacent streets or public spaces where the UE 110 is not permitted to be during designated work hours. In some cases, the boundaries of a non-compliance zone can be established based on organizational security requirements and operational protocols. In some cases, the boundaries of a non-compliance zone can be configured according to hierarchical levels within the organization, ensuring that different roles or departments have specific restricted areas. Non-compliance zones can be defined within or outside of a geofence, encompassing internal or external areas where the presence of the UE 110 is prohibited.

The UE 110 can identify the presence of a first non-compliance event by analyzing the location data determined by the UE 110. For example, the location data can be compared against the boundary information specified in the location policy. In some cases, if the location data indicates that the UE 110 has moved outside or out of a compliance zone, the UE 110 can determine that a non-compliance event has occurred. In some cases, if the location data indicates that the UE 110 has entered a non-compliance zone, the UE 110 can determine that a non-compliance event has occurred. As a corollary, if the location data indicates that the UE 110 is within compliance zone, the UE 110 can determine that the UE 110 is within compliance, or that no non-compliance event has occurred. Similarly, if the location data indicates that the UE 110 has moved outside or out of a non-compliance zone, the UE 110 can determine that it is within compliance, or that no non-compliance event has occurred. In some cases, this determination can involve checking the current position of the UE 110, as provided in the location data, against the boundaries of the compliance and non-compliance zones.

Consider a scenario where an organization has a group of employees and a shared pool of UEs 110. At the start of their shift, an individual can select a UE 110 from the shared pool (e.g., located in the docking system 140) and assign that UE 110 to that individual for the duration of their shift, by loading their user profile onto the UE 110. The user profile can include a location policy, setting geographical limits for the individual. The location policy can define one or more compliance zones and/or one or more non-compliance zones. In this scenario, the UE 110 can identify the presence of a first non-compliance event based on a determination that the UE is no longer residing in a compliance zone.

At block 506, the UE 110 determines that the presence of the first non-compliance event aligns temporally with a permissible absence period. It will be appreciated that there can be instances where moving outside of a compliance zone or being in a non-compliance zone is acceptable and does not necessarily constitute a critical non-compliance event. For example, the primary goal in some cases may be to ensure that no one removes a UE 110 from the premises accidentally. However, in some scenarios, non-compliance events detected during permissible absences, such as lunch breaks or other temporary departures from the compliance zone, can be considered acceptable, as it can be assumed that the worker will return shortly. These acceptable non-compliance events may be instances where the UE 110 can allow for minor deviations without triggering alarms or significant alarms.

A user profile may be associated with a schedule, such as one indicating an anticipated start time, permissible absence period, or end time of a work period. This schedule can specify work hours, duration, permissible absences, or buffer periods around these times. User profiles can be dynamically associated with compliance zones and non-compliance zones based on the schedule and location policies. For example, the compliance zone can be expanded or contracted during different times of the day to reflect varying operational requirements or security protocols. Non-compliance zones can also be configured to account for temporary restrictions or permissions, or changes in the work environment.

As another example, if an individual exits a compliance zone or crosses a boundary corresponding to a non-compliance zone during work hours, the UE 110 may identify the presence of a non-compliance event. However, if that non-compliance event aligns temporally with a permissible absence period, such as a lunch break, it may not be deemed critical. For instance, a buffer period can be preconfigured from 12:00 PM to 12:30 PM for lunch or from 3:00 PM to 3:15 PM for a short break. These breaks can be dynamically determined based on the time of day or the length of time the individual has been working, ensuring flexibility in monitoring, and allowing for acceptable deviations without triggering significant alarms.

A permissible absence period can be a specific duration during which the presence of the UE 110 outside of a compliance zone or within a non-compliance zone is acceptable and does not trigger a critical non-compliance event. These periods can be integrated into the user profile's schedule and can include breaks, lunch periods, other authorized absences, or buffer periods around these times. A buffer period, in this context, can refer to an additional timeframe surrounding the permissible absence period to account for minor deviations. These buffer periods can be dynamically determined based on factors such as the time of day or the length of time the individual has been working. For instance, a buffer period of 10 minutes before and after a lunch break may be implemented to provide flexibility, ensuring that temporary departures do not immediately result in a non-compliance event.

At block 508, the UE 110 refrains from triggering a notification by the UE 110 in response to the first non-compliance event, based upon the determination of the temporal alignment with the permissible absence period. The UE 110 can evaluate the timing of the non-compliance event in relation to the user profile's schedule. If a non-compliance event occurs during a permissible absence period, such as a scheduled break or lunch time, the UE 110 can decide not to trigger an alert. This approach allows for acceptable non-compliance events that are within the expected and permitted absences and/or to differentiate between acceptable and critical non-compliance events.

At block 510, similar to block 504, the UE 110 identifies the presence of a second non-compliance event based on the location data and the user profile.

At block 512, the UE 110 determines that the presence of the second non-compliance event does not align temporally with a permissible absence period.

At block 514 the UE 110 causes the issuance of a notification by the UE 110 in response to the presence of the second non-compliance event. These notifications can include, but are not limited to, visual alerts, audible alarms, or vibration signals on the UE 110. In some cases, the severity of these notifications can escalate over time or as the UE 110 moves further away from the compliance zone. For instance, an initial notification might be a gentle reminder or a subtle vibration. If the UE 110 continues to move away from the compliance zone or if more time passes without corrective action, the notifications can become more urgent, including louder alarms, flashing lights, or repeated vibration signals. In some cases, the UE 110 or the CPS 130 can also send alerts to supervisors or security personnel, providing real-time updates on the non-compliance event and enabling swift intervention. In some cases, notifications can be sent to a secondary device, such as the individual's personal cell phone, ensuring that the individual receives the alert even if they are not in close proximity to the UE 110. This tiered notification system can increase the likelihood that minor deviations are addressed promptly while escalating the response for more significant non-compliance events, thereby maintaining the integrity of the compliance protocols.

At block 516, similar to block 410 of FIG. 4, the UE 110 transmits an indication of its location to the CPS 130. In some cases, the indication of the location includes specifics such as "3rd floor, Room 318." In some cases, the indication of the location relates to the second non-compliance event. For example, the location data can pinpoint the exact position where the non-compliance event was detected, such as "5th floor, Restricted Access Area." This information allows the CPS 130 to log and monitor non-compliance events accurately, facilitating timely interventions and detailed record-keeping. In certain scenarios, the CPS 130 can use this data to generate reports or alerts for supervisory personnel, ensuring that non-compliance events are addressed in accordance with organizational protocols and security measures. In some cases, the indication can be a general notification that the UE 110 has encountered a non-compliance event, without specifying precise location details. This general indication can allow the CPS 130 to log and monitor non-compliance events broadly, enabling timely interventions and adherence to organizational protocols and security measures.

It will be understood that fewer, more, or different blocks can be used as part of the routine 500 of FIG. 5. For example, in some cases, one, some, or all of the blocks may be performed by the CPS 130, rather than by the UE 110 itself. In certain embodiments, one or more of the blocks may be combined or performed concurrently. For instance, the determination of a compliance event may be based on assessing that the timing does not align temporally with a permissible absence period. In some embodiments, certain steps may be omitted. For example, there may be no active steps for refraining from triggering a notification. Additionally, routine 500 may include two divergent paths; for example, blocks 504-508 can constitute one path, while blocks 510-514 may represent an alternative path.

In certain embodiments, there may be a block for determining a high-risk period and escalating notifications if a non-compliance event occurs during this high-risk period. In contrast to a permissible absence period, certain intervals may be identified as high-risk compliance monitoring intervals when non-compliance events are more likely to occur. These high-risk periods can include times such as the end of a worker's shift or when an individual enters specific zones like a parking lot. For instance, if the anticipated end time of a worker's shift is 5:00 PM, the high-risk period can be set from 4:45 PM to 5:15 PM. During this interval, the UE 110 can be configured to be on high alert to ensure that the UE 110 is returned and not accidentally taken off the premises. Similarly, when a worker enters the parking lot, the UE 110 can prompt a reminder to return the UE 110 before leaving. These high-risk compliance monitoring intervals can be dynamically configured in the user profile to enhance compliance and security measures, ensuring that potential issues are addressed promptly.

In some cases, one, some, or all of the blocks of routine 500 can be performed by the CPS 130. For example, at block 502, the UE 110 can communicate and/or the CPS 130 can receive location data. The UE 110 can assess its movement and determine whether to send an update to the CPS 130. When the UE 110 detects a location change that meets the criteria for an update, the UE 110 can transmit an indication of its location to the CPS 130. This indication of its location can be the location data received by the CPS 130 at block 502.

In some cases, there may be a block for the CPS 130 sending a notification of a non-compliance event to a responsible entity. This can include, for example, notifying supervisory personnel, security teams, or other designated individuals within the organization. The notification can detail the nature of the non-compliance event, the location of the UE 110, or any relevant contextual information. By doing so, the CPS 130 informs responsible entities, which can take appropriate actions to address the non-compliance event in accordance with organizational protocols and security measures.

Figure 6:
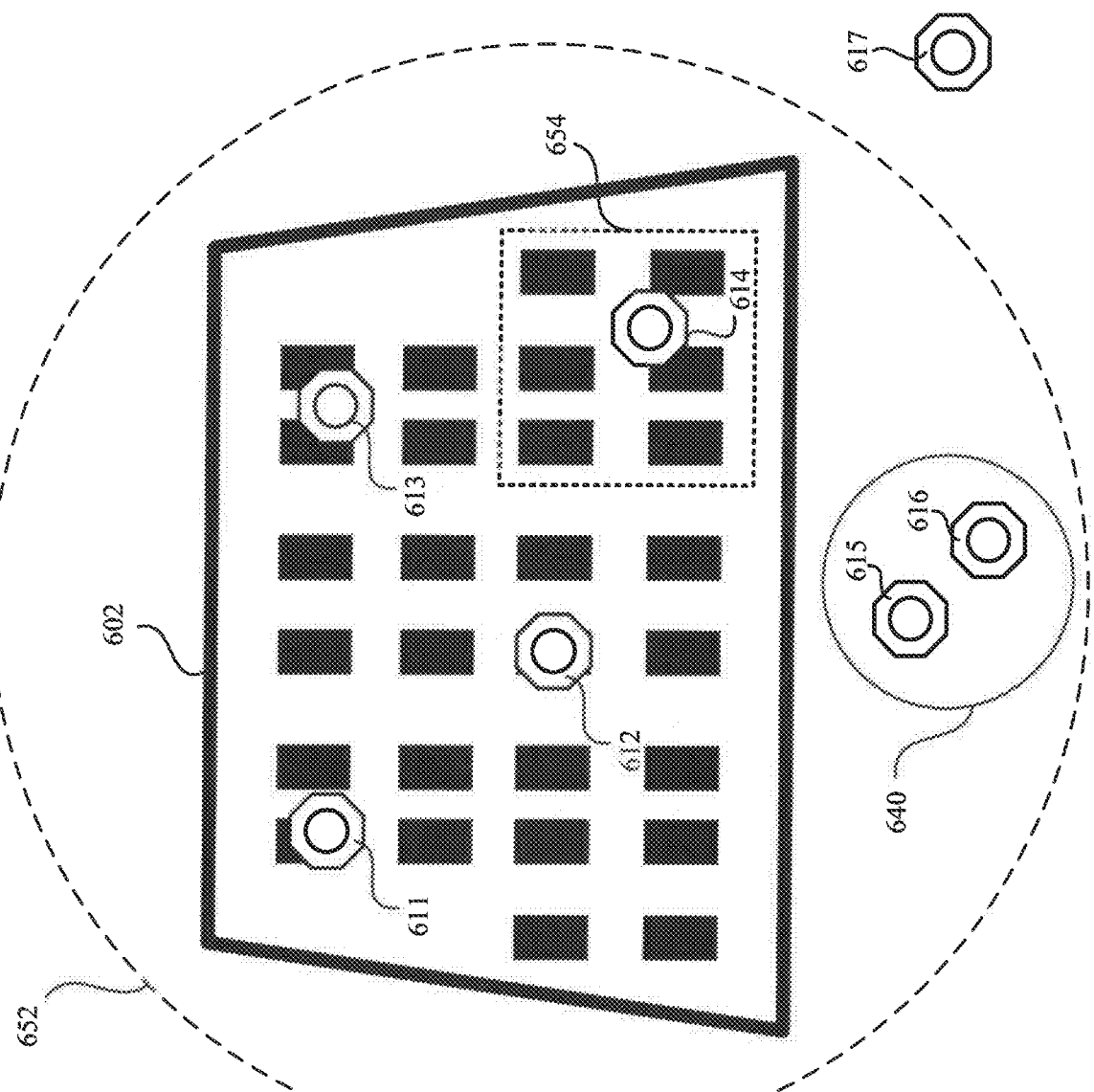
FIG. 6 illustrates an environment for monitoring compliance of various UEs, according to some embodiments of the inventive concepts.

FIG. 6 illustrates an environment 600 for monitoring compliance of various UEs. The environment 600 includes an office building 602, a UE docking system 640, and a fleet of UE 612, 613, 614, 615, 617, 617, which are represented by hexagons with interior circles. The layout of FIG. 6 demonstrates an example of device management system's 100 capability to dynamically monitor and enforce compliance zones, ensuring that UEs remain within permissible areas or designated operational zones during their assigned shifts.

The docking system 640 may be an embodiment of the docking system 140 of FIG. 1. For example, the docking system 640 can provide a designated home location for the fleet of UEs, offering a specific spot for charging and/or secure storage. In some cases, the docking system 640 can serve as a location for UEs when they are not in active use or need recharging.

The environment 600 shows various compliance and/or non-compliance zones, which are shown in broken lines. For example, the boundary labeled 652 defines a compliance zone, within which the UEs 612, 613, 614, 615, 617, 617 are expected to remain during their designated operational periods. In this illustration, UE 617 is positioned outside the compliance zone 652, indicating a non-compliance event. This position may trigger the UE 617 to issue a notification or alert, indicating that UE 617 has moved beyond the permissible geographical limits as defined by the location policy associated with its user profile. This non-compliance event can be detected based on the location data determined and analyzed by UE 617.

Furthermore, FIG. 6 includes a non-compliance zone defined by boundary 654. This boundary 654 may represent a specific area within the building 602, such as a restricted office area or another sensitive zone where the presence of UEs is controlled more stringently. Within this non-compliance zone, UE 614 is depicted as being in non-compliance, as it is located within a designated restricted area. This non-compliance may be due to the UE 614 entering a zone where it is not permitted, thereby triggering the UE 614 to detect a non-compliance event. This detection can be based on the location data determined by UE 614 and cross-referenced with the boundaries of compliance and non-compliance zones stored at the UE 617 and/or CPS 130, and/or associated with a user profile that is active on the UE 614.

Other UEs, such as UEs 611, 612, and 613, are shown within the compliance zone 652 and are in compliance with their respective location policies.

TERMINOLOGY

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method for managing a plurality of user equipments (UEs), wherein the UEs are part of a system communicable with a communication platform server (CPS) over an Internet Protocol (IP) network and configured to transmit location data in response to geographical position changes, the method comprising:
   identifying, by a UE, location data indicative of a location of the UE relative to a designated coverage area, wherein the UE is associated with a user profile, wherein the user profile comprises a location policy that defines geographical boundaries, the geographical boundaries comprising at least one of a compliance zone, within which a presence of the UE is within compliance of the location policy, or a non-compliance zone, within which the presence of the UE is not within compliance of the location policy;
   storing environmental layout data for a collection of wireless communication nodes deployed throughout the designated coverage area, wherein the environmental layout data comprises information that uniquely identifies each wireless communication node and associates each wireless communication node with a distinct location within the designated coverage area;
   receiving RF transmissions from at least one wireless communication node within the collection of wireless communication nodes, wherein the received RF transmission signal strength from a wireless communication node is based on its proximity to the UE,
   wherein identifying the location of the UE is based on an analysis of the signal strengths of the at least one wireless communication node RF transmission and the environmental layout data;
   identifying, by the UE, a presence of a non-compliance event based on the location data and location policy of the user profile, wherein the identifying comprises determining that the UE is at least one of not within the compliance zone, or within the non-compliance zone; and
   causing issuance of a notification by the UE in response to the presence of the non-compliance event.

2. The method of claim 1, wherein the identifying comprises assessing compliance of the UE with the location policy by cross-referencing the location data with the geographical boundaries.

3. The method of claim 2, wherein the identifying comprises determining that the location data indicates the UE has either exited the compliance zone or entered the non-compliance zone.

4. The method of claim 1, wherein the non-compliance event is a second non-compliance event, the method further comprising:
   identifying a presence of a second non-compliance event;
   determining that the presence of the second non-compliance event coincides temporally with a permissible absence period; and
   refraining from issuing a notification for the second non-compliance event.

5. The method of claim 4, wherein the user profile defines the permissible absence period within the user profile, wherein the permissible absence period permits the UE to be outside the compliance zone or within the non-compliance zone without triggering an alarm for a non-compliance event.

6. The method of claim 4, wherein the permissible absence period is dynamically configured based on a schedule associated with the user profile, the schedule comprising at least one of designated work hours, break times, or buffer periods.

7. The method of claim 1, wherein the user profile defines a high-risk period, wherein the high-risk period defines intervals when non-compliance events are more likely to occur, the method further comprising:
   determining that the non-compliance event coincides temporally with the high-risk period; and
   escalating the notification to a more urgent alert, wherein the escalation comprises increasing a frequency of the notification.

8. The method of claim 7, wherein the high-risk period corresponds to an end of a worker's shift.

9. The method of claim 1, wherein the issuance of the notification by the UE comprises triggering at least one of a visual alert, an audible alarm, or a vibrational signal on the UE.

10. The method of claim 9, further comprising escalating a severity of the notification over time or as the UE moves further away from the compliance zone.

11. The method of claim 1, further comprising:
   receiving a set of user credentials corresponding to a user initiating a session with the UE;
   retrieving, from a data repository, the user profile, wherein the user profile is associated with the user credentials; and
   associating the user profile with the UE for a duration of the session.

12. The method of claim 11, wherein the user credentials are received via an NFC chip integrated in a user badge, and wherein the associating of the user profile with the UE is performed automatically upon detection of the NFC chip.

13. The method of claim 4, further comprising sending a notification of the second non-compliance event to the CPS.

14. A system comprising:
a communication platform server (CPS);
one or more user equipments (UEs) communicable with the CPS, each UE including one or more RF transmitters and a global positioning system (GPS) module; and
a plurality of RF beacons placed about an area configured to define a geo-fence boundary for the UEs wherein a specific location of each RF beacon is known to the CPS,
wherein the UE is configured to:
store environmental layout data for the plurality of RF beacons deployed throughout the designated coverage area, wherein the environmental layout data comprises information that uniquely identifies each RF beacon and associates each RF beacon with a distinct location within the designated coverage area; and
receive RF transmissions from at least one RF beacon within the plurality of RF beacons, wherein the received RF transmission signal strength from a RF beacon is based on its proximity to the UE,
wherein to identify the location of the UE, the UE identifies the location based on an analysis of the signal strengths of the at least one RF beacon RF transmission and the environmental layout data, and
wherein the system is configured to send an alert to the UE when the UE has not received a signal from at least one RF beacon within a predetermined update period, and a last known GPS location of the UE is outside the geo-fence boundary.

15. The system of claim 14, wherein the alert comprises an audio message played on the UE, the audio message indicative that the UE is outside the geo-fence boundary.

16. The system of claim 14, wherein the UE is configured to:
identify location data indicative of a location of the UE relative to a designated coverage area, wherein the UE is associated with a user profile, wherein the user profile comprises a location policy that defines geographical boundaries, the geographical boundaries comprising at least one of a compliance zone, within which a presence of the UE is within compliance of the location policy, or a non-compliance zone, within which the presence of the UE is not within compliance of the location policy; and
identify a presence of a non-compliance event based on the location data from the UE and location policy of the user profile, including determining that the UE is at least one of not within the compliance zone, or within the non-compliance zone,
wherein the UE triggers the alert in response to the presence of the non-compliance event.

17. The system of claim 14, wherein each UE is associated with a user profile, the user profile comprising a geo-fence boundary within the geo-fence boundary comprising at least one of a compliance zone, within which a presence of the UE is within compliance of the geo-fence boundary, or a non-compliance zone, within which the presence of the UE is not within compliance of the geo-fence boundary.

18. The system of claim 17, wherein the system is further configured to identify a non-compliance event based on location data determined by the UE and the geo-fence boundary of the user profile based on determining that the UE is at least one of not within the compliance zone, or within the non-compliance zone.

19. The system of claim 17, wherein the system receives a set of user credentials corresponding to a user initiating a session with the UE; retrieves the user profile from a data repository, the user profile being associated with the user credentials; and associates the user profile with the UE for a duration of the session.

20. A non-transitory computer-readable medium storing instructions that, when executed by a processor of a user equipment (UE), perform a method for dynamically enforcing geographical compliance of the UE through location-based monitoring and event notification, wherein the UE is part of a plurality of radio frequency (RF) facilitated UEs, each UE of the plurality of UEs configured to communicate with a communications platform server (CPS) over an Internet Protocol (IP) network and to receive RF transmissions directly from any wireless communication node in a collection of wireless communication nodes deployed throughout a designated coverage area, the method comprising:
identifying location data indicative of a location of the UE relative to the designated coverage area, wherein the UE is associated with a user profile, wherein the user profile comprises a location policy that defines geographical boundaries, the geographical boundaries comprising at least one of a compliance zone, within which a presence of the UE is within compliance of the location policy, or a non-compliance zone, within which the presence of the UE is not within compliance of the location policy;
storing environmental layout data for a collection of wireless communication nodes deployed throughout the designated coverage area, wherein the environmental layout data comprises information that uniquely identifies each wireless communication node and associates each wireless communication node with a distinct location within the designated coverage area;
receiving RF transmissions from at least one wireless communication node within the collection of wireless communication nodes, wherein the received RF transmission signal strength from a wireless communication node is based on its proximity to the UE,
wherein identifying the location of the UE is based on an analysis of the signal strengths of the at least one wireless communication node RF transmission and the environmental layout data;
identifying a presence of a non-compliance event based on the location data and location policy of the user profile, wherein the identifying comprises determining that the UE is at least one of not within the compliance zone, or within the non-compliance zone; and
causing issuance of a notification by the UE in response to the presence of the non-compliance event.

21. The non-transitory computer-readable medium of claim 20, wherein the identifying comprises assessing compliance of the UE with the location policy by cross-referencing the location data with the geographical boundaries.

22. The non-transitory computer-readable medium of claim 21, wherein the identifying comprises determining that the location data indicates the UE has either exited the compliance zone or entered the non-compliance zone.

23. The non-transitory computer-readable medium of claim 20, wherein the non-compliance event is a second non-compliance event, the method further comprising:
identifying a presence of a second non-compliance event;
determining that the presence of the second non-compliance event coincides temporally with a permissible absence period; and refraining from issuing a notification for the second non-compliance event.

24. The non-transitory computer-readable medium of claim 23, wherein the user profile defines the permissible absence period within the user profile, wherein the permissible absence period permits the UE to be outside the compliance zone or within the non-compliance zone without triggering an alarm for a non-compliance event.

25. The non-transitory computer-readable medium of claim 23, wherein the permissible absence period is dynamically configured based on a schedule associated with the user profile, the schedule comprising at least one of designated work hours, break times, or buffer periods.

26. The non-transitory computer-readable medium of claim 20, wherein the issuance of the notification by the UE comprises triggering at least one of a visual alert, an audible alarm, or a vibrational signal on the UE.

27. The non-transitory computer-readable medium of claim 20, wherein the method further comprises escalating a severity of the notification over time or as the UE moves further away from the compliance zone.

\* \* \* \* \*